US012683899B1

(12) United States Patent
Mandal et al.

(10) Patent No.: US 12,683,899 B1
(45) Date of Patent: Jul. 14, 2026

(54) METHODS, SYSTEMS, AND COMPUTER READABLE MEDIA FOR ANALYZING DATA CENTER CONGESTION CONTROL

(71) Applicant: Keysight Technologies, Inc., Santa Rosa, CA (US)

(72) Inventors: Kingshuk Mandal, Kolkata (IN); Suranjan Saha, Benachity Durgapur (IN)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 169 days.

(21) Appl. No.: 18/790,402

(22) Filed: Jul. 31, 2024

(51) Int. Cl.
| | |
|---|---|
| *G06F 15/173* | (2006.01) |
| *H04L 41/147* | (2022.01) |
| *H04L 41/16* | (2022.01) |
| *H04L 43/045* | (2022.01) |
| *H04L 47/127* | (2022.01) |

(52) U.S. Cl.
CPC .......... *H04L 47/127* (2013.01); *H04L 41/147* (2013.01); *H04L 41/16* (2013.01); *H04L 43/045* (2013.01)

(58) Field of Classification Search
CPC ..... H04L 47/127; H04L 41/147; H04L 41/16; H04L 43/045
See application file for complete search history.

(56) References Cited

U.S. PATENT DOCUMENTS

| | | | | |
|---|---|---|---|---|
| 6,904,015 | B1 * | 6/2005 | Chen | H04L 47/326 370/429 |
| 9,614,765 | B2 * | 4/2017 | Calavrezo | H04L 47/24 |
| 11,258,719 | B1 * | 2/2022 | Sommers | H04L 47/2466 |
| 2013/0124753 | A1 * | 5/2013 | Ansari | H04L 47/30 709/235 |
| 2019/0354406 | A1 | 11/2019 | Ganguli et al. | |
| 2019/0386924 | A1 | 12/2019 | Srinivasan et al. | |
| 2020/0067792 | A1 | 2/2020 | Aktas et al. | |
| 2020/0120029 | A1 | 4/2020 | Sankaran et al. | |
| 2020/0280518 | A1 * | 9/2020 | Lee | H04L 47/115 |
| 2020/0326971 | A1 | 10/2020 | Yang | |

(Continued)

OTHER PUBLICATIONS

Choi, et al., "NCAC: Network Congestion Analyzer and Controller", DARPA Information Survivability Conference and Exposition, pp. 1-3 (2003).

(Continued)

*Primary Examiner* — Padma Mundur

(57) ABSTRACT

A method for analyzing data center congestion control includes capturing packets traversing network switches in a data center configured with data center quantized congestion notification (DCQCN) parameters to regulate congestion in the data center. The method further includes generating, from the captured packets, a congestion notification packet (CNP) profile for the data center and a visualization of real traffic rates in the data center. The method further includes configuring a DCQCN performance predictor with the DCQCN parameters and providing the CNP profile as input to the DCQCN performance predictor. The method further includes simulating, by the DCQCN performance predictor, congestion control of the data center and generating, as output, a visualization of simulated ideal traffic rates in the data center given the CNP profile and the DCQCN parameters.

20 Claims, 11 Drawing Sheets

Capture packets traversing network switches in a data center configured with data center quantized congestion notification (DCQCN) parameters to regulate congestion in the data center — 1000

Generate, from the captured packets, a congestion notification packet (CNP) profile for the data center and a visualization of real traffic rates in the data center — 1002

Configure a DCQCN performance predictor with the DCQCN parameters and providing the CNP profile as input to the DCQCN performance predictor — 1004

Simulate, by the DCQCN performance predictor, congestion control of the data center and generating, as output, a visualization of simulated ideal traffic rates in the data center given the CNP profile and the DCQCN parameters — 1006

(56)          References Cited

U.S. PATENT DOCUMENTS

| | | |
|---|---|---|
| 2020/0366608 A1 | 11/2020 | Pan et al. |
| 2021/0112002 A1 | 4/2021 | Pan et al. |
| 2022/0014457 A1* | 1/2022 | Liu ......................... H04L 43/50 |
| 2022/0060422 A1 | 2/2022 | Sommers |
| 2022/0210071 A1* | 6/2022 | Meng ..................... H04L 41/12 |
| 2024/0129220 A1 | 4/2024 | Stan et al. |

OTHER PUBLICATIONS

Chen, et al., "Chameleon: Automatic and Adaptive Tuning for DCQCN Parameters in RDMA Networks", ACM SIGCOMM '23: Proceedings of the ACM SIGCOMM 2023 Conference, pp. 1091-1093 (2023).

Musleh, et al., "Fabsim-X: A Simulation framework for the Analysis of Large-Scale Topologies and Congestion Control Protocols in Data Center Networks", 2020 28th International Symposium on Modeling, Analysis, and Simulation of Computer and Telecommunication Systems (MASCOTS), pp. 1-8 (2020).

Zhu, et al., "Congestion Control for large-Scale RDMA Deployments", SIGCOMM '15, pp. 1-14 (2015).

Notice of Allowance for U.S. Appl. No. 17/001,614 (Sep. 29, 2021).

Even et al, "Data Center Fast Congestion Management," pp. 1-15 (Oct. 23, 2019).

Li et al., "HPCC: High Precision Congestion Control," SIGCOMM '19, pp. 1-15 (Aug. 19-23, 2019).

"Traffic Management User Guide (QFX Series and EX4600 Switches)," Juniper Networks, pp. 1-1121 (Mar. 18, 2020).

"H3C S6850 Series Data Center Switches," New H3C Technologies Co., Limited, pp. 1-13 (Mar. 2020).

Liu et al., "HPCC++: Enhanced High Precision Congestion Control," Network Working Group, pp. 1-15 (Jun. 17, 2020).

Beltman et al., "Collecting telemetry data using P4 and RDMA," University of Amsterdam, pp. 1-12 (2020).

"RoCE Congestion Control Interoperability Perception vs. Reality," Broadcom White Paper, pp. 1-8 (Jul. 23, 2019).

"What is RDMA?," Mellanox, pp. 1-3 (Apr. 7, 2019).

Mandal, "In-band Network Telemetry—More Insight into the Network," Ixia, https://www.ixiacom.com/company/blog/band-network-telemetry-more-insight-network, pp. 1-9 (Mar. 1, 2019).

Geng et al., "P4QCN: Congestion Control Using P4-Capable Device in Data Center Networks," Electronics, vol. 8, No. 280, pp. 1-17 (Mar. 2, 2019).

"Understanding DC-QCN Algorithm for RoCE Congestion Control," Mellanox, pp. 1-4 (Dec. 5, 2018).

"Data Center Quantized Congestion Notification (DCQCN)," Juniper Networks, pp. 1-7 (Oct. 4, 2018).

"Understanding RoCEv2 Congestion Management," Mellanox, https://community.mellanox.com/s/article/understanding-rocev2-congestion-management, pp. 1-6 (Dec. 3, 2018).

Mittal et al, "Revisiting Network Support for RDMA," SIGCOMM '18, pp. 1-14 (Aug. 20-25, 2018).

Varadhan et al., "Validating ROCEV2 in the Cloud Datacenter," OpenFabrics Alliance, 13th Annual Workshop 2017, pp. 1-17 (Mar. 31, 2017).

Zhu et al, "ECN or Delay: Lessons Learnt from Analysis of DCQCN and TIMELY," CoNEXT '16, pp. 1-15 (Dec. 12-15, 2016).

Kim et al., "In-band Network Telemetry (INT)," pp. 1-28 (Jun. 2016).

Zhu et al., "Congestion Control for Large-Scale RDMA Deployments," SIGCOMM '15, pp. 1-14 (Aug. 17-21, 2015).

Zhu et al., "Packet-Level Telemetry in Large Datacenter Networks," SIGCOMM '15, pp. 1-13 (Aug. 17-21, 2015).

Mittal et al., "TIMELY: RTT-based Congestion Control for the Datacenter," SIGCOMM '15, pp. 1-14 (Aug. 17-21, 2015).

"RoCE in the Data Center," Mellanox Technologies, White Paper, pp. 1-3 (Oct. 2014).

Barak, "Introduction to Remote Direct Memory Access (RDMA)," http://www.rdmamojo.com/2014/03/31/remote-direct-memory-access-rdma/, pp. 1-14 (Mar. 31, 2014).

"Quick Concepts Part 1—Introduction to RDMA," ZCopy, Education and Sample Code for RDMA Programming, pp. 1-5 (Oct. 8, 2010).

Alizadeh et al., "Data Center TCP (DCTCP)," SIGCOMM '10, pp. 1-12 (Aug. 30-Sep. 3, 2010).

Grochla, "Simulation comparison of active queue management algorithms in TCP/IP networks," Telecommunication Systems, pp. 1-9 (Oct. 2008).

Chen et al., "Data Center Congestion Management requirements," https://tools.ietf.org/id/draft-yueven-tsvwg-dccm-requirements-01.html, pp. 1-7 (Jul. 2019).

* cited by examiner

FIG. 2

| Number | Time | Length | Source IP | Destinatio | ECN Bit | OpCode | Destination QP |
|---|---|---|---|---|---|---|---|
| 1 | 0.003068 | 1082 | 20.0.0.14 | 20.0.0.11 | 1 | 0 | 0x000011 |
| 2 | 0.003085 | 1082 | 20.0.0.14 | 20.0.0.11 | 1 | 1 | 0x000011 |
| 3 | 0.003091 | 1082 | 20.0.0.14 | 20.0.0.11 | 1 | 1 | 0x000011 |
| 4 | 0.003097 | 1082 | 20.0.0.14 | 20.0.0.11 | 1 | 1 | 0x000011 |
| 5 | 0.003103 | 762 | 20.0.0.14 | 20.0.0.11 | 1 | 2 | 0x000011 |
| 6 | 0.003118 | 62 | 20.0.0.11 | 20.0.0.14 | 1 | 17 | 0x000011 |
| 7 | 0.003314 | 1098 | 20.0.0.11 | 20.0.0.14 | 1 | 6 | 0x000011 |
| 8 | 0.003326 | 1082 | 20.0.0.11 | 20.0.0.14 | 1 | 7 | 0x000011 |
| 9 | 0.003332 | 1082 | 20.0.0.11 | 20.0.0.14 | 1 | 7 | 0x000011 |
| 10 | 0.003338 | 1082 | 20.0.0.11 | 20.0.0.14 | 1 | 7 | 0x000011 |
| 11 | 0.003342 | 1082 | 20.0.0.11 | 20.0.0.14 | 1 | 7 | 0x000011 |
| 12 | 0.003347 | 1082 | 20.0.0.11 | 20.0.0.14 | 1 | 7 | 0x000011 |
| 13 | 0.003352 | 1082 | 20.0.0.11 | 20.0.0.14 | 1 | 7 | 0x000011 |
| 14 | 0.003357 | 1082 | 20.0.0.11 | 20.0.0.14 | 1 | 8 | 0x000011 |
| 15 | 0.003387 | 62 | 20.0.0.14 | 20.0.0.11 | 1 | 17 | 0x000011 |

FIG. 3

```
<data>
    <entry>
        <type>Multiple</type>
        <number>10</number>
        <repetition>50</repetition>
    </entry>
</data>
```

FIG. 5

```
<data>
    <entry>
        <type>Single</type>
        <time>10</time>
    </entry>
    <entry>
        <type>Single</type>
        <time>20</time>
    </entry>
</data>
```

FIG. 6

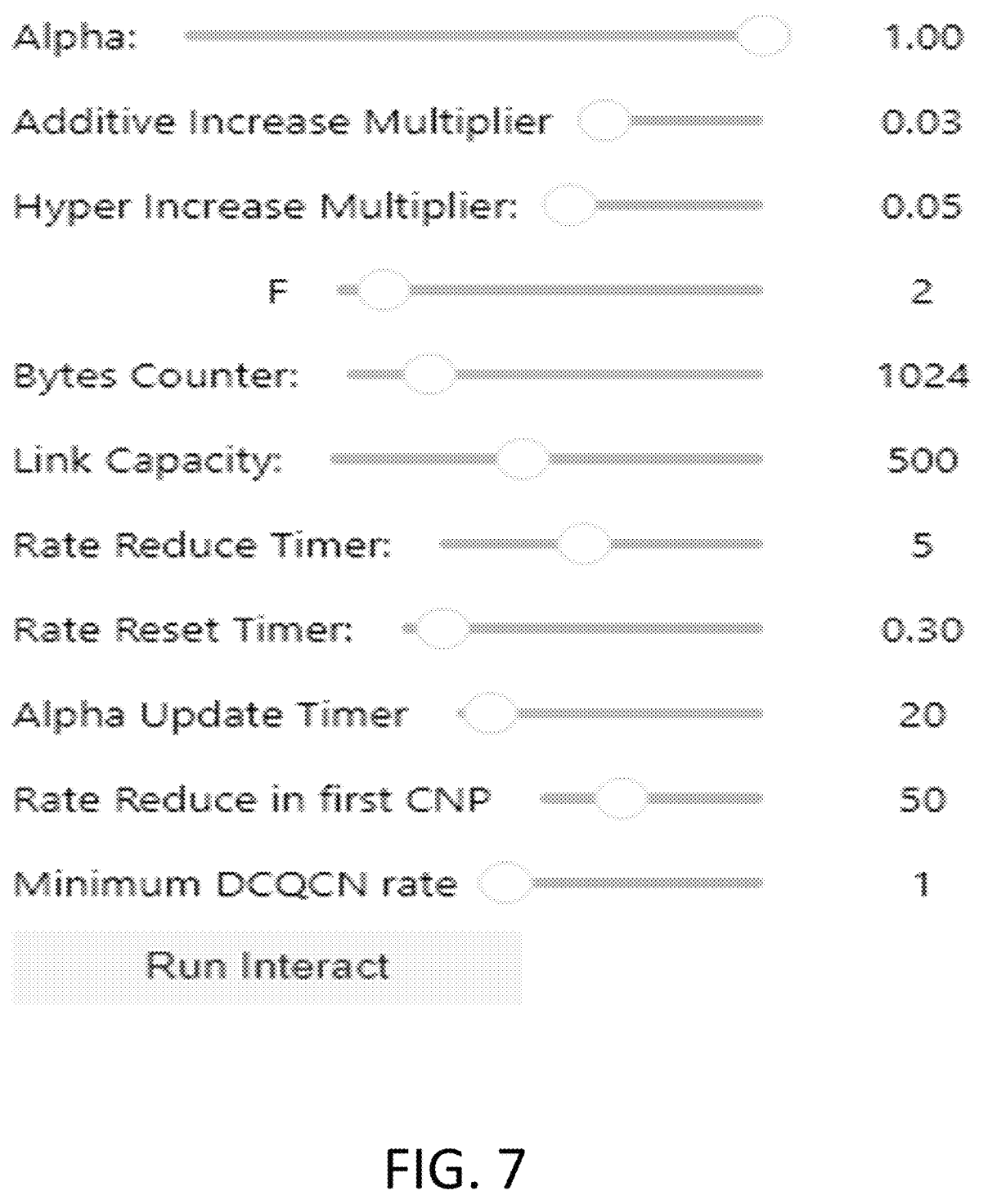

Alpha:          ━━━━━━━━━━━━━━━━⬤          1.00

Additive Increase Multiplier          ⬤━━━━━          0.03

Hyper Increase Multiplier:          ⬤━━━━          0.05

F          ⬤━━━━━━━━━━          2

Bytes Counter:          ━⬤━━━━━━━          1024

Link Capacity:          ━━━━⬤━━━          500

Rate Reduce Timer:          ━━━━⬤━━          5

Rate Reset Timer:          ⬤━━━━━━━          0.30

Alpha Update Timer          ⬤━━━━━━          20

Rate Reduce in first CNP          ━━⬤━━━          50

Minimum DCQCN rate          ⬤━━━━━          1

Run Interact

FIG. 7

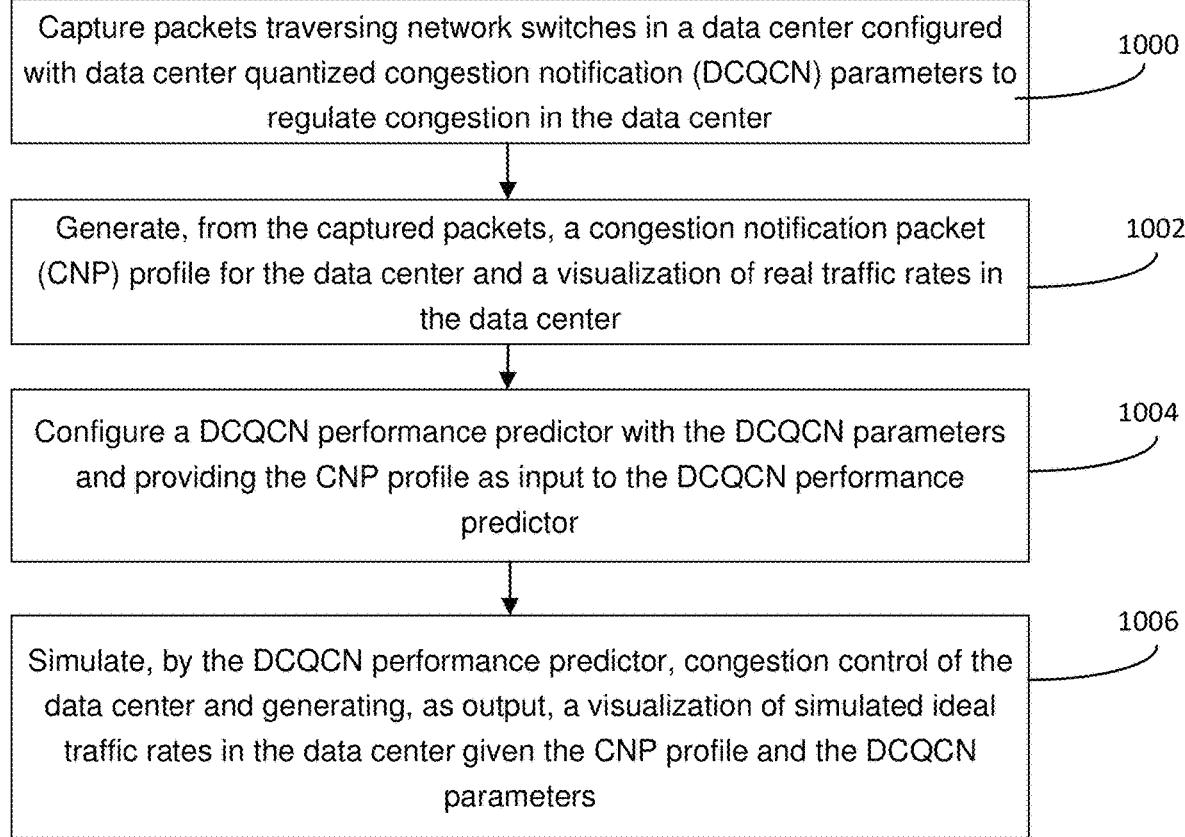

Capture packets traversing network switches in a data center configured with data center quantized congestion notification (DCQCN) parameters to regulate congestion in the data center

1000

Generate, from the captured packets, a congestion notification packet (CNP) profile for the data center and a visualization of real traffic rates in the data center

1002

Configure a DCQCN performance predictor with the DCQCN parameters and providing the CNP profile as input to the DCQCN performance predictor

1004

Simulate, by the DCQCN performance predictor, congestion control of the data center and generating, as output, a visualization of simulated ideal traffic rates in the data center given the CNP profile and the DCQCN parameters

METHODS, SYSTEMS, AND COMPUTER READABLE MEDIA FOR ANALYZING DATA CENTER CONGESTION CONTROL

TECHNICAL FIELD

The subject matter described herein relates to congestion control mechanisms used in data centers. More particularly, the subject matter described herein relates to methods, systems, and computer readable media for analyzing data center congestion control.

BACKGROUND

Data centers perform complex and resource-intensive tasks, such as artificial intelligence/machine learning (AI/ML) model training, which requires efficient management of traffic among data center processing nodes. One congestion control mechanism is data center quantized congestion notification (DCQCN) where packets arriving at a switch are marked with an explicit congestion notification (ECN) if the queue depth at the switch exceeds a threshold. When an ECN-marked packet reaches its destination, the destination notifies the flow originator of the congestion by generating and sending a congestion notification packet (CNP) to the flow originator. The flow originator then decreases the flow rate to reduce the congestion in the network.

Because efficient communication between data center switches is critical to performing complex tasks, such as AI model training, there is a need to analyze congestion control mechanisms used to regulate traffic in data centers. Specifically, there is a need to understand the causes of congestion in data centers and to quantify the effectiveness of data center congestion control mechanisms.

SUMMARY

A method for analyzing data center congestion control includes capturing packets traversing network switches in a data center configured with data center quantized congestion notification (DCQCN) parameters to regulate congestion in the data center. The method further includes generating, from the captured packets, a congestion notification packet (CNP) profile for the data center and a visualization of real traffic rates in the data center. The method further includes configuring a DCQCN performance predictor with the DCQCN parameters and providing the CNP profile as input to the DCQCN performance predictor. The method further includes simulating, by the DCQCN performance predictor, congestion control of the data center and generating, as output, a visualization of simulated ideal traffic rates in the data center given the CNP profile and the DCQCN parameters.

According to another aspect of the subject matter described herein, capturing packets traversing network switches in the data center includes capturing packets relating to an artificial intelligence model training workload in the data center.

According to another aspect of the subject matter described herein, generating the CNP profile includes capturing CNP packets and extracting information from headers of the packets.

According to another aspect of the subject matter described herein, the information from the headers of the packets includes frame length, source Internet protocol (IP)

address, destination IP address, queue pair ID (QpID), explicit congestion notification (ECN) marking, opcode, and packet timestamp.

According to another aspect of the subject matter described herein, generating the CNP profile includes generating a multiple CNP profile that instructs the DCQCN performance predictor to simulate transmission of multiple CNPs.

According to another aspect of the subject matter described herein, generating the CNP profile includes generating a single CNP profile that instructs the DCQCN performance predictor simulate transmission of a single CNP.

According to another aspect of the subject matter described herein, generating the visualization of real traffic rates includes generating a graph of traffic rates versus time in the data center.

According to another aspect of the subject matter described herein, configuring the DCQCN performance predictor with the DCQCN parameters includes configuring the DCQCN performance predictor with the same DCQCN parameters used to regulate congestion in the data center.

According to another aspect of the subject matter described herein, simulating the congestion control includes executing a model that predicts a target rate and a current rate given the CNP profile and the DCQCN parameters.

According to another aspect of the subject matter described herein, generating the visualization of simulated ideal traffic rates includes generating a graph of the simulated ideal traffic rates over time in the data center.

According to another aspect of the subject matter described herein, a system for analyzing data center congestion control is provided. The system includes at least one processor and a memory. The system further includes a packet capture module executed by the at least one processor for capturing packets traversing network switches in a data center configured with data center quantized congestion notification (DCQCN) parameters to regulate congestion in the data center. The system further includes a congestion signal extractor executed by the at least one processor for generating, from the captured packets, a congestion notification packet (CNP) profile for the data center and a visualization of real traffic rates in the data center. The system further includes a DCQCN performance predictor executed by the at least one processor for receiving, as input, the DCQCN parameters and the CNP profile, simulating congestion control of the data center and generating, as output, a visualization of simulated ideal traffic rates in the data center given the CNP profile and the DCQCN parameters.

According to another aspect of the subject matter described herein, the packets traversing network switches in the data center includes packets relating to an artificial intelligence model training workload in the data center.

According to another aspect of the subject matter described herein, the CNP profile includes information extracted from headers of the captured packets, including frame length, source Internet protocol (IP) address, destination IP address, queue pair ID (QpID), explicit congestion notification (ECN) marking, opcode and packet timestamp.

According to another aspect of the subject matter described herein, the CNP profile includes a multiple CNP profile that instructs the DCQCN performance predictor to simulate transmission of multiple CNPs.

According to another aspect of the subject matter described herein, the CNP profile includes a single CNP profile that instructs the DCQCN performance predictor to simulate transmission of a single CNP.

According to another aspect of the subject matter described herein, the visualization of real traffic rates includes a graph of real traffic rates versus time in the data center.

According to another aspect of the subject matter described herein, the DCQCN parameters received as input to the DCQCN performance predictor include the same DCQCN parameters used to regulate congestion in the data center.

According to another aspect of the subject matter described herein, the DCQCN performance predictor is configured to execute a model that predicts a target rate and a current rate given the CNP profile and the DCQCN parameters.

According to another aspect of the subject matter described herein, the visualization of simulated ideal traffic rates includes a graph of the simulated ideal traffic rates over time in the data center.

According to another aspect of the subject matter described herein, a non-transitory computer readable medium having stored thereon executable instructions that when executed by a processor of a computer control the computer to perform steps is provided. The steps include capturing packets traversing network switches in a data center configured with data center quantized congestion notification (DCQCN) parameters to regulate congestion in the data center. The steps further include generating, from the captured packets, a congestion notification packet (CNP) profile for the data center and a visualization of real traffic rates in the data center. The steps further include configuring a DCQCN performance predictor with the DCQCN parameters and providing the CNP profile as input to the DCQCN performance predictor. The steps further include simulating, by the DCQCN performance predictor, congestion control of the data center and generating, as output, a visualization of simulated ideal traffic rates in the data center given the CNP profile and the DCQCN parameters.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which:

FIG. 2 illustrates an example of a packet capture that may be provided as input to the congestion signal extractor;

FIG. 3 illustrates an example of the captured packet data after being preprocessed by the congestion signal extractor to extract data to be used in generating the CNP profile and the rate visualization for the real network;

FIG. 5 is a computer screen shot illustrating an example of a multiple CNP profile;

FIG. 6 is a computer screen shot illustrating an example of a single CNP profile;

FIG. 7 illustrates an example graphical presentation of input parameters to the DCQCN performance predictor;

FIG. 10 is a flow chart illustrating an exemplary process for data center congestion analysis.

DETAILED DESCRIPTION

Figure 1A:
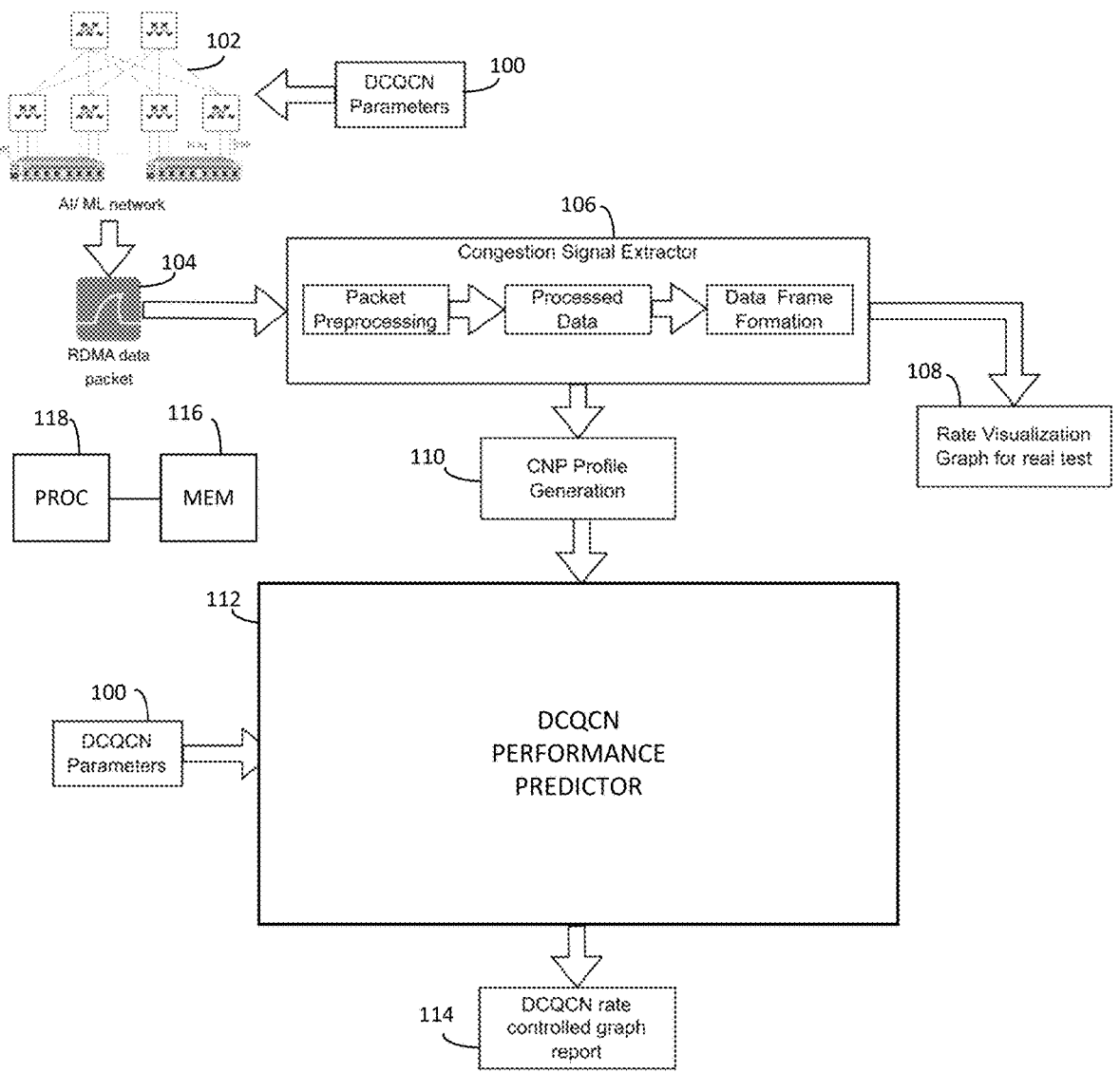
FIG. 1A is a block diagram illustrating an exemplary architecture for analyzing data center congestion control.

The increasing complexity of AI models requires high-bandwidth, low-latency networks for efficient model training. Even small changes in network utilization can significantly impact training time, and congestion can cause severe delays. A small degradation of flow performance in network can have a huge impact on graphics processing unit (GPU) utilization in AI model training data centers. Congestion control methods, such as DCQCN, are crucial for maintaining continuous data flow and preventing network collapse. However, validating the effectiveness of these algorithms can be challenging due to their intricate decision-making processes and the dynamic nature of network environments. Therefore, the subject matter described herein includes a data center congestion analyzer specifically designed to analyze the inner workings of DCQCN. This tool will provide detailed visualizations of how flow rates are adjusted in real networks to avoid congestion. The tool also helps in improving DCQCN-based congestion control by identifying areas for further parameter fine tuning.

Introduction

In a remote direct memory access (RDMA)-based AI/ML network, traffic flows are uniquely identified by a destination queue pair (QP) ID. The modern landscape of data center networks demands efficient management of congestion and proper regulation of the traffic flows so that the network links that carry traffic are not underutilized. Moreover, congestion experienced by one network flow should not victimize other flows—the other flows should be allowed to continue transmission. The DCQCN algorithm has emerged as one of the fundamental algorithms for achieving the above objectives, particularly in large-scale, high-performance data center environments. The operation of DCQCN's rate control mechanisms must be understood and optimized as data center architectures change to accommodate ever-increasing traffic volumes and different workloads.

This introduction describes the background of DCQCN, its significance in data center networking, and the difficulties in deciphering its intricate behavior.

The DCQCN algorithm operates by controlling congestion on a per-flow basis, rather than pausing all of the traffic going out of an egress port, as performed in priority-based flow control (PFC). The DCQCN algorithm expects the transit switches in the path to mark outgoing packets with an ECN when the switch is about to face congestion. The switch that marks packet with an ECN is referred to as a detection point. Once the ECN-marked packet reaches its destination, the destination RDMA network interface card (NIC) generates a CNP towards the flow originator. These CNPs are special data packets containing a special opcode and the destination QP number for which the ECN is marked. When the CNP is received on the transmit side, the flow originator decreases the flow rate using a set of mathematical equations known as the rate reduction algorithm. After the rate reduction, the system gradually increases the rate by utilizing different rate recovery algorithms. DCQCN has three rate recovery algorithms that are executed successively according to different DCQCN parameters. Along with the different parameters of DCQCN, the buffers of the data center nodes also play a major role in stabilizing the traffic rate without causing any loss of data. More complications can occur when multiple flows (QPs) are in the network, and all of the flows must be flow controlled individually and simultaneously. Flows will always compete with each other for bandwidth, and the DCQCN algorithm will harmonize the flows dynamically through flow control at the source. The objective of the DCQCN algorithm is for every communicating flow to receive a fair share of bandwidth without dropping packets.

Based on the description above, we can conclude that measuring/analyzing how the rate control is performing in a dynamic data center environment is a challenging problem. Without this analysis, it is not possible to find an effective way to maintain lossless and highly efficient data center networks for AI model training. The subject matter described herein analyzes the various methods through which the rate is controlled. Rate control methods are analyzed using RDMA data captures from a real data center performing a task, such as AI model training, as input, and then the CNP patterns from the captured traffic are analyzed to understand the behavior of DCQCN and how DCQCN controls the rate.

The main challenge with rate-controlling algorithms like DCQCN in a network performing AI model training is understanding how congestion occurs. We must first comprehend the rate at which ECN packets are being marked (at many detection points in the network) and CNPs are being generated (at the reaction point). The next challenge is interpreting CNPs to reduce simulated data rates. After that, the flow source needs to focus on how to recover the reduced rate, ensuring that rate recovery is neither too fast nor too slow. Our primary goal is to create lossless and highly efficient traffic flows. To achieve this, we must closely analyze and understand how rates change during the execution of the DCQCN algorithm, from the rate reduction steps to rate recovery for each flow. The following section describes an exemplary method and a system for analyzing and measuring the congestion control efficiency.

One method for analyzing DCQCN involves the following components and steps.

1. First, we utilize an RDMA congestion signal extractor to derive necessary information from the capture and plot the graph of a real test rate run on a real network.

2. Second, we utilize a DCQCN mathematical model to mimic the behavior of the DCQCN algorithm throughout the test by taking the DCQCN parameters as input from the user. These input parameters are the same input parameters given to the real network devices in the data center network performing the AI model training task.

3. Third, in the real network, the congestion control triggers come though CNPs. So, from the real network captures, we extract these triggers and generate a CNP profile, which is provided as input to a DCQCN mathematical model implemented by a DCQCN performance predictor.

4. Fourth, the mathematical model takes the CNP profile as additional input and predicts the flow behavior (flow rate, delay, etc.) one should observe in the real network.

5. The simulated data center performance can be compared to the real data center performance to evaluate how close the real flow behavior is (created in the first step) to that of an ideal DCQCN implementation (the mathematical predictions created in the fourth step).

6. Divergence from ideal flow behavior is output as a fidelity score.

The lower the fidelity score, the more unoptimized the network is for AI/ML training.

FIG. 1A is a block diagram illustrating an exemplary architecture for analyzing data center congestion control. Referring to FIG. 1A, in a real test run a user inputs DCQCN parameters 100 into a real data center 102 that is performing a compute task, such as AI/ML model training. An RDMA data packet capture module 104 captures packet traffic, including packets relating to congestion control, from the real data center and provides the captured packets to a congestion signal extractor 106. Congestion signal extractor 106 preprocesses the data and outputs a rate visualization graph 108 for the real data center. Congestion signal extractor 106 also outputs congestion control parameters or packets to a CNP profile generator 110. CNP profile generator 110 generates a CNP profile that indicates how the real data center 102 responded to the congestion control. A DCQCN performance predictor 112 receives the CNP profile generated by CNP profile generator 110 and the same DCQCN parameters 100 provided to real data center 102, simulates data center packet flow performance given DCQCN parameters 100 and the CNP profile, and outputs a visualization 114 of ideal data center performance. The ideal data center performance is then compared to the real data center performance to evaluate the effectiveness of the data center congestion control. Packet capture module 104, congestion signal extractor 106, CNP profile generator 110, and DCQCN performance predictor 112 may be implemented using computer executable instructions stored in one or more memories 116 and executed by one or more processors 118.

Congestion Signal Extractor

Upon receiving an RDMA over converged Ethernet (RoCE) (a protocol for low latency, high throughput data transfer in data centers) capture, our goal is to monitor the flow and observe the trend in flow rate changes for each QP. We will track the flow in conjunction with the arrival of RDMA write packets without ECN markings and CNPs (congestion signals). Analyzing these types of packets will provide insight into how the rate is being controlled in the network by the DCQCN algorithm in the RoCE framework.

Input

Figure 2:
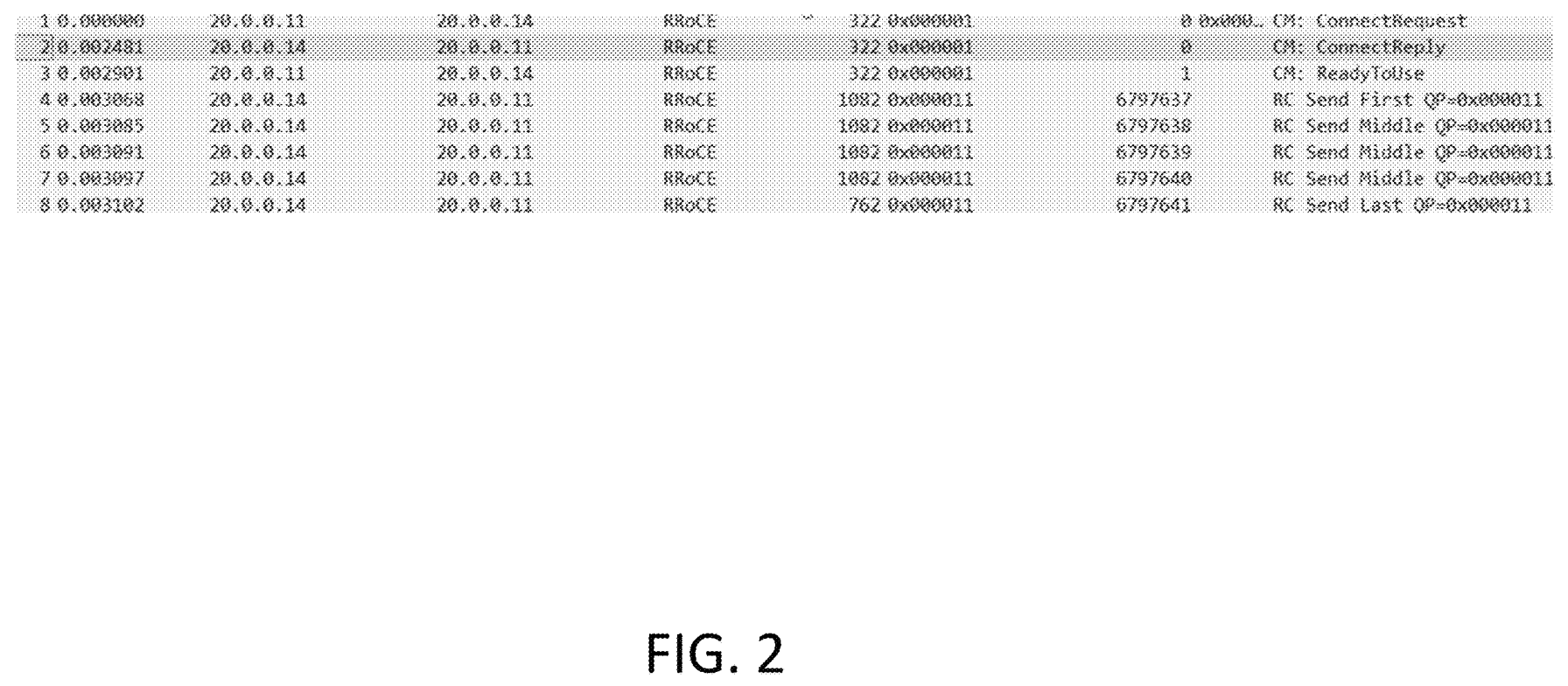

From real network 102, RDMA data capture module 104 will capture the RDMA communications between QPs along with the congestion signals (CNPs) generated in network 102 and provide the captured packets to congestion signal extractor 106. A sample RDMA communication contains all RoCE RDMA write packets and CNPs for all the QPs. FIG. 2 illustrates an example of a packet capture that may be provided as input to congestion signal extractor 106. The captured packet data includes packet header fields, including source and destination IP address, packet size, packet type, and QP ID.

Data Pre-Processing by Congestion Signal Extractor

Data preprocessing of the capture file will involve steps for filtering the data to extract congestion control parameters. To analyze flow throughput in the network during a test, congestion signal extractor 106 filters the captured packets and extracts specific information. FIG. 3 illustrates an example of the captured packet data after being preprocessed by congestion signal extractor 106 to extract data to be used in generating the CNP profile and the rate visualization for the real network. As illustrated in FIG. 3, the extracted information includes values from fields from each packet header, such as frame length, source IP address, destination IP address, QP ID, ECN marking, opcode, and packet timestamp.

After extracting the relevant data from the captured packets, congestion signal extractor 106 performs the following steps to generate rate visualization graph 108.

For every queue pair, we need to observe the flow. Since we cannot directly determine the flow rate from a single data packet, we will calculate the flow rate using the formula: (total number of bytes received in a given time window)/ (time window). The concept of a time window makes the calculation fine grained. The time window will be a customizable parameter for our use. The end user can configure the time window to achieve a desired rate resolution.

Figure 4:
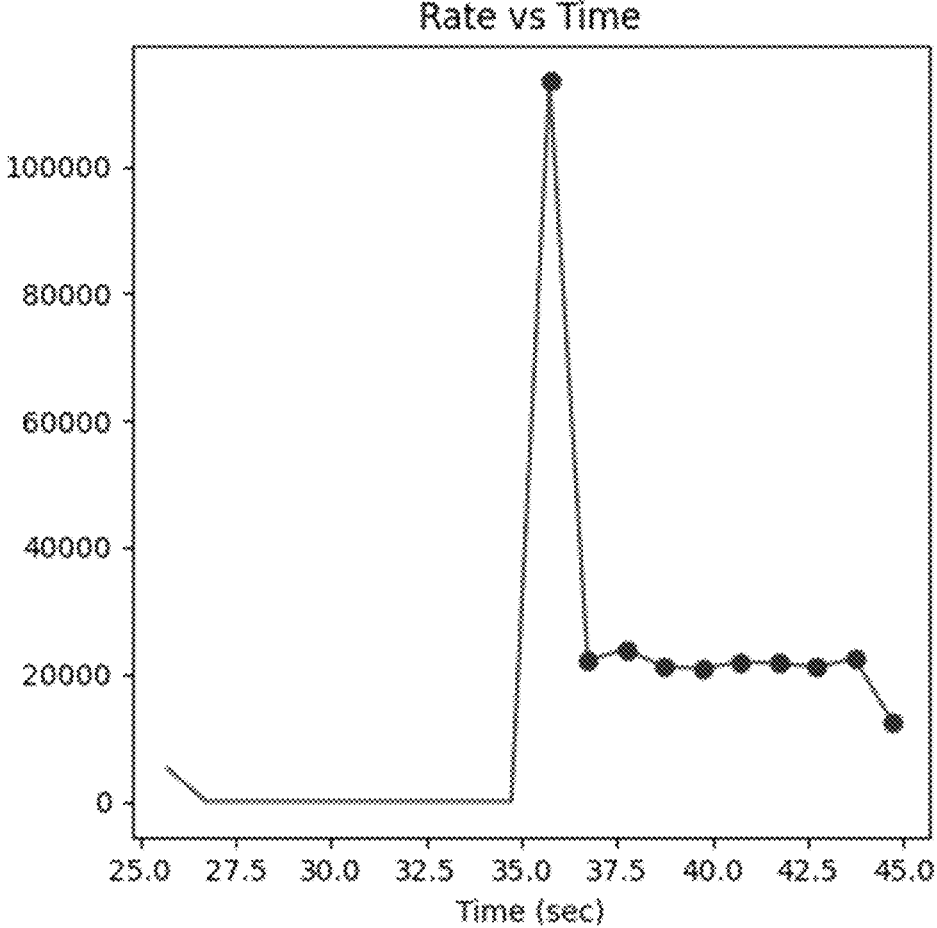
FIG. 4 illustrates a graph of the data rate (in megabytes per second) vs. time (in seconds) that may be generated by the congestion signal analyzer for a real RDMA capture for a queue pair.

Once congestion signal extractor 106 calculates the observed rates, congestion signal extractor 106 creates rate visualization graph 108, which illustrates the observed rate versus time for a specific QP. When plotting the graph, congestion signal extractor 106 identifies and overlays the congestion signal that a flow has experienced. Congestion signal extractor 106 identifies these signals by the ECN marked packets in the packet capture by analyzing whether the ECN_CE bit is set or not. Each ECN-marked packet will result in the generation of a CNP, allowing congestion signal extractor 106 to create a plot that displays the rate alongside the CNPs. FIG. 4 illustrates a graph of the data rate (in megabytes per second) vs. time (in seconds) that may be generated by congestion signal extractor 106 for a real RDMA capture for a queue pair. In FIG. 4, the congestion control signals are indicated by the plotted points. When the first congestion control signal is received, the data rate drops sharply. The remaining congestion control signals in FIG. 4 cause smaller drops in the data rate, likely because the sender is trying to recover the data rate at the time of receipt of the first congestion control signal.

DCQCN Performance Predictor

The next part of the solution described herein is DCQCN performance predictor 112. In the previous section, we described the capture of real data and the use of the data to plot the real rate versus time along with the CNPs. In this part of our solution, we will use the DCQCN parameter values (as used in the test) and the CNPs to theoretically simulate and plot traffic rate changes during the test.

CNP Profile Generation

The first step in the DCQCN simulation is to generate input for DCQCN performance predictor 112 reflective of how and when the CNPs are being generated. For this input, we define a structure referred to herein as the CNP profile. CNP profile generator 110 populates the CNP profile from the CNP data received from the RDMA data capture. The defined and populated CNP profile is reflective of congestion signals that the real network faced while the test was running. We use XML to form the CNP profiles. CNP profile generator 110 generates the following two types of CNP profiles:

Multiple Profile—A multiple CNP profile causes simulation of multiple CNPs and can repeat after a fixed interval of time. FIG. 5 is a computer screen shot of a multiple CNP profile. In FIG. 5, the number value in the XML data represents the number of CNPs received, and the repetition value indicates the time in ticks after which the CNP is generated again. Accordingly, the CNP profile in FIG. 5 will cause 10 CNPs to be generated every 50 ticks.

Single Profile—The single CNP profile causes simulation of a single CNP at specific time and is not repeated. FIG. 6 is a computer screen shot of a single CNP profile. In FIG. 6, the time value in the XML data indicates the time (in ticks) when the CNP was received. Accordingly, the CNP profile in FIG. 6 will cause a CNP to be generated at 10 ticks and another CNP to be generated at 20 ticks.

It should be noted that a populated CNP profile created by CNP profile generator 110 can be any combination of one or more single/multiple CNP profile substructures.

Input Parameters

The CNP profile serves as the main input for DCQCN performance predictor 112. In addition to this, there are a number of parameters that users need to configure with the same values used in the devices in the real network whose response to congestion control is being evaluated. These parameters are as follows:

Alpha Value—The alpha value is a congestion scaling factor that ranges between 0 and 1. The alpha value influences the extent of rate reduction and is essential for managing congestion in the network.

Additive Increase Rate—This parameter determines the rate at which the sender should recover its rate during the additive increase phase of rate recovery.

Hyper Increase Rate—This parameter determines the rate at which the sender should recover its rate during the hyper increase phase of rate recovery.

Recovery Iterations (F)—This parameter controls when the rate recovery will enter the fast recovery, additive increase, and the hyper increase state.

Byte Counter—This parameter determines the threshold for calling the additive increase state over the hyper increase state and fast recovery.

Link Capacity—This parameter is used to signify the speed of the link being evaluated.

Rate Reduce Timer (in ticks)—This is the timer after which the algorithm checks for CNPs. If a CNP is found, the algorithm reduces the rate.

Rate Reset Timer (in ticks)—This is the timer after which the algorithm calls the rate recovery algorithm.

Alpha Update Timer (in ticks)—Each time this timer expires the alpha variable is updated in the algorithm.

Rate Reduce in First CNP—This parameter determines the rate that we need to set after we receive the first CNP.

Minimum DCQCN rate—this parameter limits the rate reduction by each rate reduction algorithm to maintain the minimum rate.

The input parameters may be presented graphically to the user as interactive sliders and buttons to allow easy configuration by the user. FIG. 7 illustrates an example graphical presentation of input parameters to DCQCN performance predictor 112. In FIG. 7, each input parameter is followed by a graphical slider and a value. By moving the graphical slider, a user can adjust the value.

Flow Rate Prediction Algorithm

The DCQCN simulation algorithm implemented by DCQCN performance predictor 112 includes two parts. The first part includes running the flow rate prediction calculation periodically. We refer to one such period as one tick. As we progress with each tick count, the algorithm checks the CNP profile to determine whether any (simulated) CNPs have been received during the tick interval. Each tick is the clock interval that drives the next rate prediction calculation. If no CNPs are received, the simulation continues without a rate decrease. However, as soon as the simulation receives its first CNP, the DCQCN algorithm is triggered. This algorithm involves two types of rates: the target rate and the current rate.

The target rate is the ideal data transmission rate for a flow, that the flow control algorithm (DCQCN) allows the flow to achieve. The target rate represents the link capacity that a flow is allowed to consume. If the flow control algorithm perceives that the network has higher bandwidth available (possibly due to some other flows having completed their transmissions) then the flow control algorithm increases the target rate of the currently active flow. The current rate is the rate at which a flow source is currently transmitting traffic.

When the DCQCN algorithm invokes a rate reduction (on receipt of a CNP signal) algorithm, the DCQCN algorithm decreases both the target rate and the current rate. After a rate reduction, the algorithm waits for the next rate reduction time to expire to undergo the next rate reduction if any CNP is accumulated over the time interval (from one rate reduction time to the next). After a rate reduction, the algorithm enters into a rate recovery mode. In this mode, the algorithm gradually recovers its reduced current rate and attempts to increase the current rate to reach the target rate. If no further CNP is received for a time period, then the target rate will also be increased. The trigger for the rate recovery algorithm for DCQCN is based on a timer (after a specific time interval expires) and a byte counter (after a certain number of bytes are transferred).

The DCQCN rate recovery algorithm consists of three modes to recover the rate:

Fast rate recovery,

Additive increase mode, and

Hyper increase mode.

Rate recovery typically begins with the fast recovery mode. During this mode, the DCQCN algorithm only increases the current rate to catch up with the target rate. As the DCQCN rate recovery algorithm progresses through the fast rate recovery stage, the algorithm gradually moves towards the next recovery mode (in the case where no further CNP is received), which is called the additive increase mode. In this stage, both the target rate and the current rate increase. An increase in the target rate without CNPs signifies that the network can increase the rate without creating congestion. After this stage comes the hyper increase stage where the target and the current rate grow exponentially. However, if we receive a CNP at any point of time, the algorithm goes to reduction mode first and then all the recovery stages follow (fast recovery, additive increase, hyper increase).

Figure 1B:
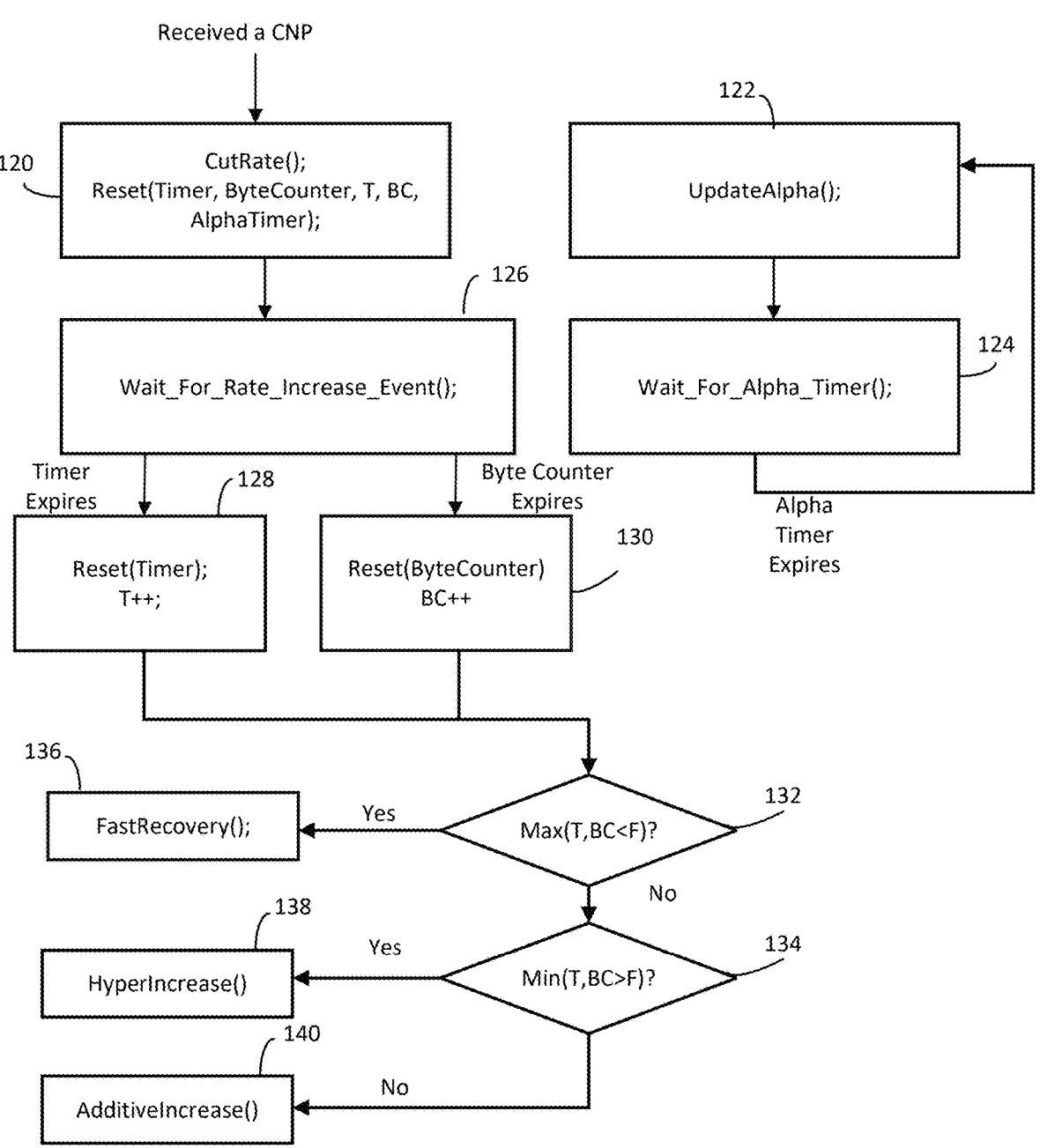
FIG. 1B is a flow chart illustrating an exemplary process performed in a rate prediction model implemented by a DCQCN performance predictor.

FIG. 1B is a flow chart for the rate prediction model implemented by DCQCN performance predictor 112, in step 120, the rate prediction model receives a CNP and executes a CutRate( ) function, which reduces the current traffic rate by an amount mathematically determined by the DCQCN algorithm. The rate prediction model also resets a type, a byte counter, a variable T, a variable BC, and an alpha timer, which controls when the alpha variable referenced above is updated. In steps 122 and 124, the rate prediction model updates the alpha variable every time the alpha timer expires.

After step 120, the rate prediction model proceeds to step 126 were the model waits for a rate increase event of either expiration of the timer (step 128) or expiration of the byte counter (step 130). If either event occurs, control proceeds to steps 132 and 134 where the model determines which rate recovery algorithm to implement. In step 132, if the conditions for the fast recovery rate recovery algorithm are met, the model proceeds to step 136 where the model executes a FastRecovery( ) function that simulates DCQCN fast recovery. If the conditions for fast recovery are not met, control proceeds to step 134 where the model checks whether the conditions for hyper increase rate recovery are met. If the conditions for hyper increase rate recovery are met, control proceeds to step 138 where the model executes a function called HyperIncrease( ) that simulates DCQCN hyper increase rate recovery. If the conditions for fast recovery and hyper increase rate recovery are not met, control proceeds to step 140 where the model executes a function called AdditiveIncrease( ), which simulates DCQCN additive increase rate recovery. After step 136, 138, or 140, the model returns to step 120 to process the next CNP.

Output

After completing the DCQCN rate prediction algorithm, DCQCN performance predictor 112 generates and displays visualization 114 of the simulation output. After the generation of these graphs, the user can compare the graph received from congestion signal extractor 106 and can review the two graphs in a side-by-side or overlay display to compare how the congestion control should affect the data rate and how the congestion control actually affected the data rate, thus providing the users a method to validate the accuracy of the congestion control mechanism used in the network.

Figure 8:
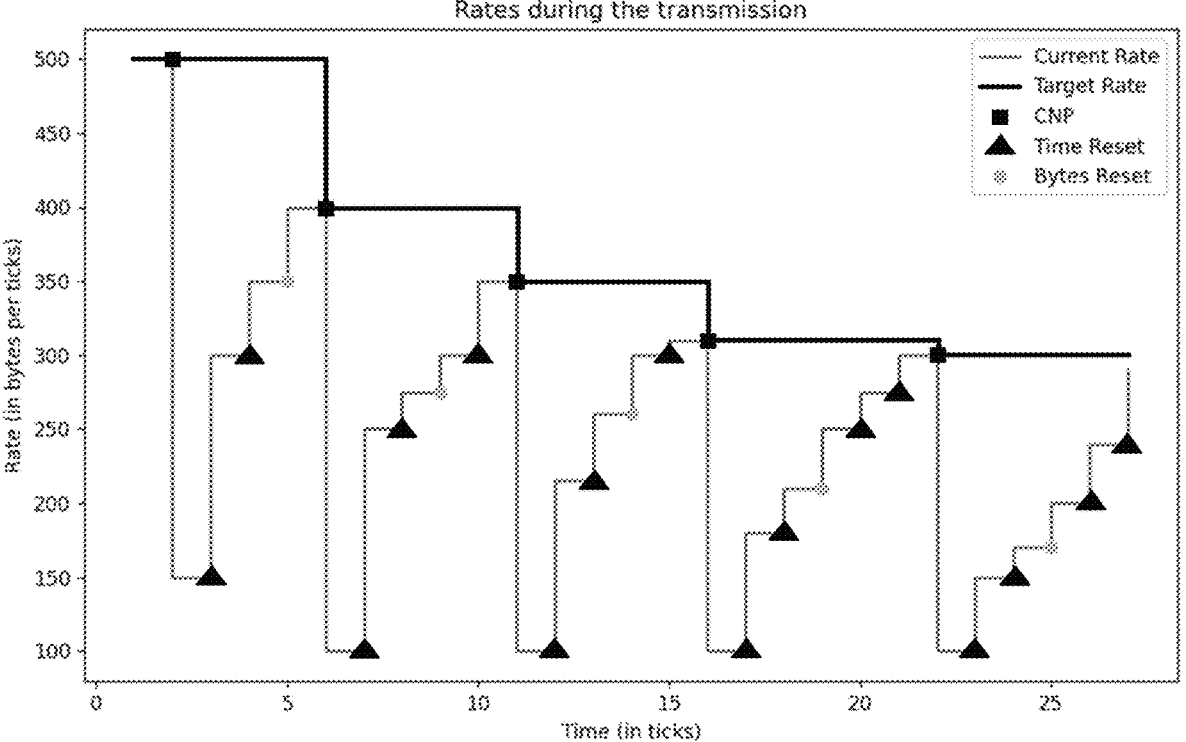
FIG. 8 is a graph of the data rate for a flow generated by the DCQCN performance predictor illustrating how DCQCN adjusts rates in response to congestion notification packets.

FIG. 8 is a graph of the data rate for a flow generated by DCQCN performance predictor 112 illustrating how DCQCN adjusts rates in response to congestion notification packets. The graph illustrates the different parameters that affect the rate and the rate recovery. In FIG. 8, the graph illustrates the current rate, the target rate, and how each rate changes in response to receipt of congestion notification packets.

Measuring Fidelity

Figure 9:
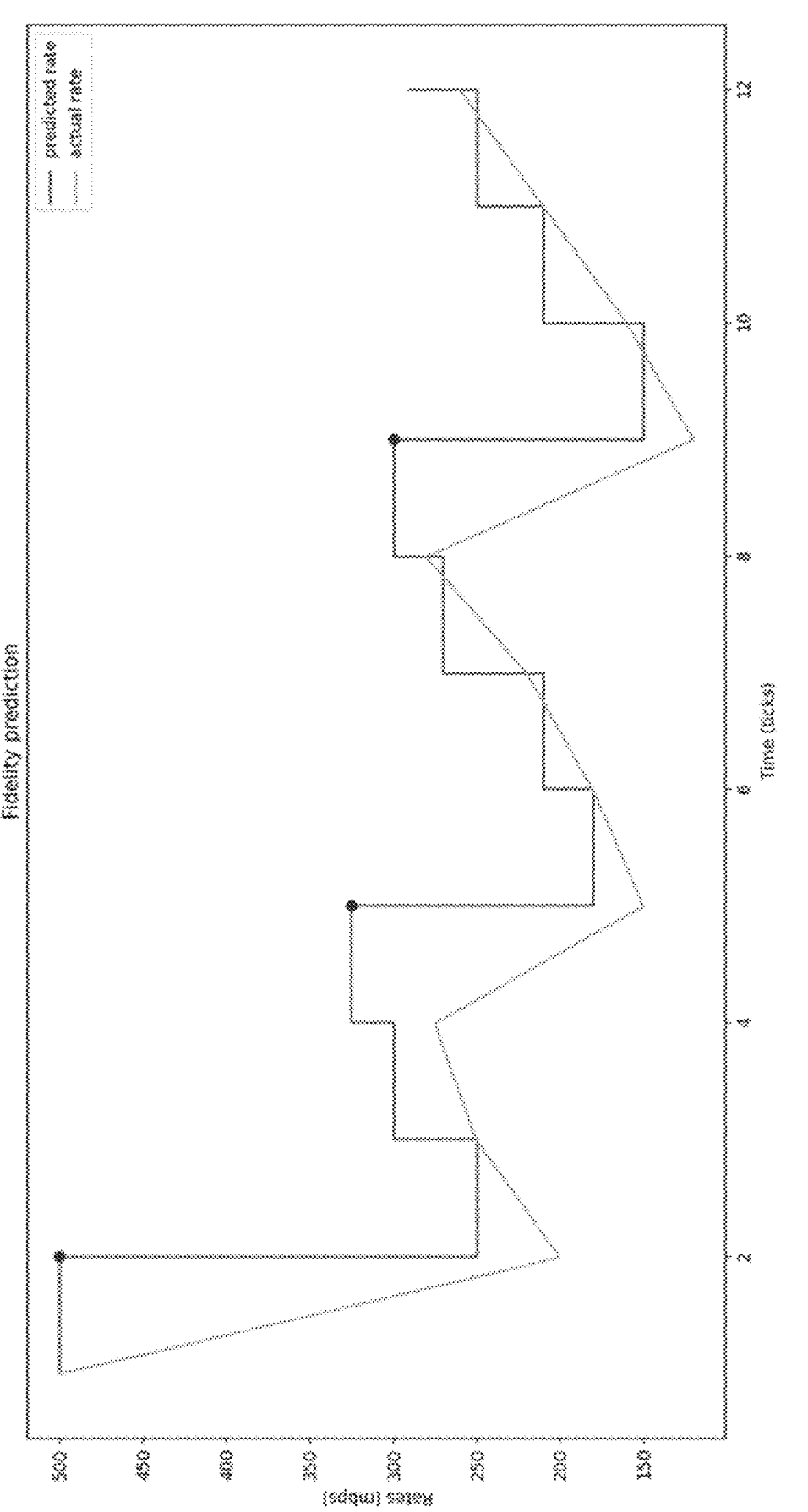
FIG. 9 is a graph of the actual and simulated data rates given the same CNP profile and DCQCN parameters.

After congestion signal extractor 106 generates visualization 108 of the rate in real data center 102 and DCQCN performance predictor 112 generates visualization 114 for the simulated DCQCN performance, DCQCN performance predictor 112 or another part of the test and simulation system can display a single graph of data from both visualizations. FIG. 9 is a graph of the actual and simulated data rates given the same CNP profile and DCQCN parameters. The actual and simulated rates can be evaluated based on two fidelities: trend fidelity and distance fidelity. The trend fidelity measures whether the predicted rate graph and the actual rate graph follow the same trend or not. In other words, trend fidelity measures if the rates change in a similar way at different points during the test. The distance fidelity, on the other hand, illustrates the distance between the actual and predicted rates at points of rate change.

FIG. 9 shows that the test has a high trend fidelity as it closely matches the pattern of the rate change along with the rate graph. At a certain point, we can observe that the actual rate is almost the same as the predicted rate, which indicates the graph has a high distance fidelity. This allows us to conclude that our network is well adapted for congestion control.

FIG. 10 is a flow chart illustrating an exemplary process for data center congestion analysis. Referring to FIG. 10, in step 1000, the process includes capturing packets traversing network switches in a data center configured with data center quantized congestion notification (DCQCN) parameters to regulate congestion in the data center. For example, RDMA data packet capture module 104 may capture, i.e., copy, packets traversing switches in a real data center executing a real or test compute task, such as AI model training.

In step 1002, the process further includes generating, from the captured packets, a congestion notification packet (CNP) profile for the data center and a visualization of real traffic rates in the data center. For example, CNP profile generator 110 may generate a CNP profile that reflects the CNPs that were transmitted in the real data center during time period of the packet capture. CNP profile generator 110 may also generate the visualization illustrated in FIG. 4 of the data rate in the data center.

In step 1004, the process further includes configuring a DCQCN performance predictor with the DCQCN parameters and providing the CNP profile as input to the DCQCN performance predictor. For example, CNP profile generator 110 may provide the CNP profile as input to DCQCN performance predictor 112, and the user may supply the DCQCN parameters to DCQCN performance predictor 112. At least some of the DCQCN parameters may be input via a graphical user interface, such as the interface illustrated in FIG. 7.

In step 1006, the process further includes simulating, by the DCQCN performance predictor, congestion control of the data center and generating, as output, a visualization of simulated ideal traffic rates in the data center given the CNP profile and the DCQCNs. For example, DCQCN performance predictor 112 may simulate rate control that would occur given the configured DCQCN parameters and the CNPs in the CNP profile and generate, as output, a visualization of simulated ideal traffic rates. In one example, the visualization is a graph, such as that illustrated in FIG. 8, which shows the predicted rate, that actual data rate, and the times of receipt of the CNPs. DCQCN performance predictor 112 may also generate a single graph or a side-by-side display of graphs that respectively illustrate the real and simulated ideal data rates. An example of a single graph that illustrates the real and simulated ideal data rates is illustrated in FIG. 9.

Benefits

The subject matter described herein provides users with a convenient way to test the quality of congestion control for their products/networks. Through various visual cues, users can understand complex scenarios in data center networks, including the behavior of each flow and how the flows are affected.

Tuning DCQCN parameters is difficult, as such tuning requires multi-parameter optimization. Users can use the CNP profile generated from data captures and feed the CNP profile to the DCQCN rate prediction algorithm. The users can then experiment with different parameters to find an optimal value without affecting the real network. An optimized congestion free AI network is a must for efficient AI model training. The subject matter described herein measures how well a network is optimized when compared to ideal congestion control. The subject matter described herein allows users to identify patterns and trends, ultimately aiding in the creation of a lossless and highly efficient data center network, which is needed for AI model training.

The solution enables users to visualize the complexities of the DCQCN algorithm with ease, using just one data capture. The same principle can be allied to measure the efficiency for any other congestion control algorithm.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for analyzing data center congestion control, the method comprising:
    capturing packets traversing network switches in a data center configured with data center quantized congestion notification (DCQCN) parameters to regulate congestion in the data center;
    generating, from the captured packets, a congestion notification packet (CNP) profile for the data center and a visualization of real traffic rates in the data center;
    configuring a DCQCN performance predictor with the DCQCN parameters and providing the CNP profile as input to the DCQCN performance predictor; and
    simulating, by the DCQCN performance predictor, congestion control of the data center and generating, as output, a visualization of simulated ideal traffic rates in the data center given the CNP profile and the DCQCN parameters.

2. The method of claim 1 wherein capturing packets traversing network switches in the data center includes capturing packets relating to an artificial intelligence model training workload in the data center.

3. The method of claim 1 wherein generating the CNP profile includes extracting information from headers of the packets.

4. The method of claim 3 wherein the information from the headers of the packets includes frame length, source Internet protocol (IP) address, destination IP address, queue pair ID (QpID), explicit congestion notification (ECN) marking, opcode and packet timestamp.

5. The method of claim 1 wherein generating the CNP profile includes generating a multiple CNP profile that instructs the DCQCN performance predictor to simulate transmission of multiple CNPs.

6. The method of claim 1 wherein generating the CNP profile includes generating a single CNP profile that instructs the DCQCN performance predictor simulate transmission of a single CNP.

7. The method of claim 1 wherein generating the visualization of real traffic rates includes generating a graph of traffic rates versus time in the data center.

8. The method of claim 1 wherein configuring the DCQCN performance predictor with the DCQCN parameters includes configuring the DCQCN performance predictor with the same DCQCN parameters used to regulate congestion in the data center.

9. The method of claim 1 wherein simulating the congestion control includes executing a model that predicts a target rate and a current rate given the CNP profile and the DCQCN parameters.

10. The method of claim 1 wherein generating the visualization of simulated ideal traffic rates includes generating a graph of the simulated ideal traffic rates over time in the data center.

11. A system for analyzing data center congestion control, the system comprising:

at least one processor and a memory;

a packet capture module executed by the at least one processor for capturing packets traversing network switches in a data center configured with data center quantized congestion notification (DCQCN) parameters to regulate congestion in the data center;

a congestion signal extractor executed by the at least one processor for generating, from the captured packets, a congestion notification packet (CNP) profile for the data center and a visualization of real traffic rates in the data center; and a DCQCN performance predictor executed by the at least one processor for receiving, as input, the DCQCN parameters and the CNP profile, simulating congestion control of the data center and generating, as output, a visualization of simulated ideal traffic rates in the data center given the CNP profile and the DCQCN parameters.

12. The system of claim 11 wherein the packets traversing network switches in the data center includes packets relating to an artificial intelligence model training workload in the data center.

13. The system of claim 11 wherein the CNP profile includes information from headers of the packets, including frame length, source Internet protocol (IP) address, destination IP address, queue pair ID (QpID), explicit congestion notification (ECN) marking, opcode, and packet timestamp.

14. The system of claim 11 wherein the CNP profile includes a multiple CNP profile that instructs the DCQCN performance predictor to simulate transmission of multiple CNPs.

15. The system of claim 11 wherein the CNP profile includes a single CNP profile that instructs the DCQCN performance predictor to simulate transmission of a single CNP.

16. The system of claim 11 wherein the visualization of real traffic rates includes a graph of real traffic rates versus time in the data center.

17. The system of claim 11 wherein the DCQCN parameters received as input to the DCQCN performance predictor include the same DCQCN parameters used to regulate congestion in the data center.

18. The system of claim 11 wherein the DCQCN performance predictor is configured to execute a model that predicts a target rate and a current rate given the CNP profile and the DCQCN parameters.

19. The system of claim 11 wherein the visualization of simulated ideal traffic rates includes a graph of the simulated ideal traffic rates over time in the data center.

20. A non-transitory computer readable medium having stored thereon executable instructions that when executed by a processor of a computer control the computer to perform steps comprising:

capturing packets traversing network switches in a data center configured with data center quantized congestion notification (DCQCN) parameters to regulate congestion in the data center;

generating, from the captured packets, a congestion notification packet (CNP) profile for the data center and a visualization of real traffic rates in the data center;

configuring a DCQCN performance predictor with the DCQCN parameters and providing the CNP profile as input to the DCQCN performance predictor; and simulating, by the DCQCN performance predictor, congestion control of the data center and generating, as output, a visualization of simulated ideal traffic rates in the data center given the CNP profile and the DCQCN parameters.

* * * * *